(12) United States Patent
Henn et al.

(10) Patent No.: US 9,884,783 B2
(45) Date of Patent: Feb. 6, 2018

(54) COATED GLASS CERAMIC PLATE

(71) Applicant: SCHOTT AG, Mainz (DE)

(72) Inventors: Christian Henn, Frei Laubersheim (DE); Eveline Rudigier-Voigt, Mainz (DE); Stephanie Mangold, Laubenheim (DE); Tanja Woywod, Mainz (DE)

(73) Assignee: SCHOTT AG, Mainz (DE)

( * ) Notice: Subject to any disclaimer, the term of this patent is extended or adjusted under 35 U.S.C. 154(b) by 599 days.

(21) Appl. No.: 14/271,729

(22) Filed: May 7, 2014

(65) Prior Publication Data

US 2014/0335349 A1 Nov. 13, 2014

(30) Foreign Application Priority Data

May 7, 2013 (DE) .................. 10 2013 104 702

(51) Int. Cl.
| | | |
|---|---|---|
| *C03C 17/34* | (2006.01) | |
| *C03C 17/00* | (2006.01) | |
| *C22C 33/02* | (2006.01) | |
| *C03C 17/36* | (2006.01) | |

(52) U.S. Cl.
CPC ........ *C03C 17/3482* (2013.01); *C03C 17/002* (2013.01); *C03C 17/36* (2013.01); *C03C 17/3618* (2013.01); *C03C 17/3649* (2013.01); *C22C 33/0285* (2013.01); *C03C 2217/72* (2013.01); *Y10T 428/26* (2015.01)

(58) Field of Classification Search
None
See application file for complete search history.

(56) References Cited

U.S. PATENT DOCUMENTS 4,615,658 A * 10/1986 Kagohara ............... C22C 30/00
148/327
5,718,777 A * 2/1998 Hashimoto ............. C22C 45/08
148/403

(Continued)

FOREIGN PATENT DOCUMENTS

DE  102004053963 A1  5/2006
EP       0183052 A2  6/1986

(Continued)

OTHER PUBLICATIONS

European Search Report dated Oct. 9, 2014 corresponding to European Patent Application No. EP 14163646, 8 pages.

(Continued)

*Primary Examiner* — Ronak Patel
(74) *Attorney, Agent, or Firm* — Ohlandt, Greeley, Ruggiero & Perle, L.L.P.

(57) ABSTRACT

A coated glass ceramic cooking plate is provided, which has a multilayer coating on its lower surface. The multilayer coating includes a metallic layer of an alloy including components chromium, iron, nickel, and silicon. The silicon content of the alloy is at least 2 atomic percent. This metallic layer is covered by a barrier layer in form of an oxide of an alloy including components chromium, iron, nickel, and silicon, also with a silicon content of at least 2 atomic percent. The molar content of oxygen of the barrier layer is greater by at least a factor of 10 than that of the metallic layer.

13 Claims, 8 Drawing Sheets

(56) References Cited

U.S. PATENT DOCUMENTS

| | | | |
|---|---|---|---|
| 2006/0046006 A1* | 3/2006 | Bastion | B32B 27/36 428/35.2 |
| 2006/0193742 A1* | 8/2006 | Miura | B22F 1/0044 419/52 |
| 2012/0103477 A1* | 5/2012 | Branagan | C22C 45/02 148/539 |
| 2012/0121923 A1 | 5/2012 | Palumbo et al. | |
| 2012/0125314 A1* | 5/2012 | Alonso Esteban | C03C 17/36 126/211 |
| 2014/0017482 A1* | 1/2014 | Tuffile | B32B 17/10 428/301.1 |

FOREIGN PATENT DOCUMENTS

| | | |
|---|---|---|
| EP | 0226993 A1 | 7/1987 |
| EP | 2559672 A1 | 2/2013 |
| JP | 2009179511 A | 8/2009 |
| WO | 2012131511 A1 | 10/2012 |

OTHER PUBLICATIONS

German Office Action dated Dec. 17, 2013 corresponding to German Patent Application No. 10 2013 104 702.5, with English translation.

\* cited by examiner

COATED GLASS CERAMIC PLATE

CROSS REFERENCE TO RELATED APPLICATIONS

This application claims benefit under 35 U.S.C. § 119(a) of German Patent Application No. 10 2013 104 702.5, filed May 7, 2013, the entire contents of which are incorporated herein by reference.

BACKGROUND OF THE INVENTION

1. Field of the Invention

The invention relates to decorative coating using vacuum coating processes for a lower surface coating of glass ceramic cooktops, especially for gas and/or induction applications. In particular, the invention relates to barrier coatings for decorative coatings.

2. Description of Related Art

Lower surface coatings on glass and glass ceramic substrates are currently produced by screen printing processes, among others, which in particular permit to obtain scattering and matte layers. When using luster colors, metallic looking lower surface coatings can be applied which have a silver-metallic glossy appearance.

Metallic reflective surfaces are commonly found nowadays as door fronts in the kitchen area. However, in the field of cooking surfaces, these colors are rather rare, since they either need to be printed using precious metal colors (e.g. Pt), which is very expensive, or because vacuum coating solutions are not sufficiently thermally stable.

Also known are sputtered dielectric interference layer systems in which the color location of the lower surface coating can be varied quickly and easily by varying the layer thickness of a high refractive index layer, without requiring significant process changes. In order to obtain such interference optical systems sufficiently resistant even under the strong thermal effects when used as a lower surface coating (400° C.-500° C.), these layer systems are subject to certain limitations on the possible combinations of materials. For example, the coloring layer, covering layer, and barrier layer are made from the same base material to make diffusion processes visually inconspicuous. This is achieved, for example, using an SiN—Si—SiN layer system. In this case, diffusion processes of the silicon are only slightly perceived visually, if the covering layer is sufficiently thick and remains optically inactive.

Mixed systems of oxides and nitrides are often disadvantageous due to a diffusion of the oxygen into the covering layer, since this results in oxidation and thus a change in color. However, since due to their high refractive indices, oxide layers are ideally suitable as coloring layers (e.g. $TiO_2$ with refractive index n>2.45; $Nb_2O_5$ with refractive index n=2.35; $Ta_2O_5$ with refractive index n=2.25), the task is to provide a thermally resistant and stable covering layer which is resistant to oxygen diffusion processes to allow for use of new colors for lower surface coatings.

Similar systems based on manufacturing under vacuum work on intrinsic coloring. Known and often mentioned is TiN, which is used in form of a TiN—Ti or a TiN—Ti—TiN layer system, for example. In this case, diffusion processes of the nitrogen into the intermediate covering layer are visually not perceived since TiN has a specific intrinsic color (golden) and so variations in layer thickness are not or only slightly noticeable. However, there is a demand for additional new colors.

Therefore, an object of the invention is to expand the color palette of decorative lower surface coatings while ensuring high thermal resistance of the coating. Even after prolonged thermal stress as it occurs in operation of a cooktop, the color location of the coating should not alter by more than an extent so that the color change is not immediately obvious. Moreover, the coating should be easy and cost-efficient to manufacture.

SUMMARY

Accordingly, the invention provides a coated glass ceramic cooking plate, with one face that defines a utilization side, and an opposite face that defines the lower surface. The lower surface has a multilayer coating thereon. The multilayer coating includes a metallic layer of an alloy including components chromium, iron, nickel, and silicon. The silicon content of the alloy is at least 1.5 atomic percent (at %), or mole percent, respectively, preferably at least 2 at %. The metallic layer is covered by a barrier layer in form of an oxide of an alloy including components chromium, iron, nickel, and silicon, with a silicon content of at least 1.5 atomic percent, preferably at least 2 atomic percent. The molar content of oxygen of the barrier layer is greater by at least a factor of 10 than that of the metallic layer.

In case of a glass ceramic cooktop comprising a glass ceramic cooking plate according to the invention, the utilization side is the upper surface upon which cooking vessels are placed, for example, such as pans and pots, or on which a gas burner assembly is mounted.

The alloys used for the metallic layer and the barrier layer are stainless steels having a comparatively high silicon content for steels. According to one embodiment of the invention, the metallic layer is directly deposited on the glass ceramic. According to this embodiment, therefore, there exists an interface between the glass ceramic and the metallic layer. The metallic layer of the composition according to invention adheres well to the glass ceramic, and in combination with the barrier layer good thermal resistance is achieved.

However, there is a limitation in terms of the color location which is determined by the transmission of light through the glass ceramic and reflection at the metallic layer. In order to produce specific color locations or specific color impressions, the invention further contemplates that the multilayer coating comprises an at least partially transparent single- or multilayered layer as a first layer on the glass ceramic, and that the metallic layer is deposited upon this first, at least partially transparent layer.

The metallic layer, due to metallic reflection, provides for a metallic effect similar to a stainless steel surface. The first, at least semi-transparent optional layer is used as a color adjustment layer or coloring layer in order to compensate for a coloring caused by the glass ceramic, or in order to obtain a new color impression.

It has been found that the comparatively high silicon content obviously provides for a particularly high temperature resistance. Especially excellent resistance in terms of color location is achieved with such a coating, even after prolonged thermal stress. Further it has surprisingly been found that, on the other side, in particular an oxide of such a stainless steel alloy forms a very effective barrier protecting the metallic layer against diffusion, oxidation, and reactions with acids or bases.

Since the barrier coating is of the same or a similar, oxidized material as the metallic layer, this ensures an excellent solid physical connection between these two layers.

The stainless steel alloys used according to the invention can easily be deposited by sputtering. Accordingly, the invention also relates to a method for producing a glass ceramic cooking plate, comprising the steps of: providing a glass ceramic plate; sputter-depositing a metallic layer of an alloy including components chromium, iron, nickel, and silicon, wherein the silicon content of the alloy is at least 2 atomic percent; producing a barrier layer that covers the metallic layer in form of an oxide of an alloy including components chromium, iron, nickel, and silicon, with a silicon content of at least 2 atomic percent, wherein a molar content of oxygen of the barrier layer is greater by at least a factor of 10 than that of the metallic layer.

According to a preferred embodiment, the above mentioned first, at least partially transparent, single- or multi-layered layer is deposited on the glass ceramic prior to the deposition of the metallic layer. This first layer serves for color adjustment or color compensation.

The barrier layer may easily be deposited by reactive sputtering from a composite target, in particular a stainless steel target, in an oxygen containing atmosphere. According to a further, alternative or additional embodiment, the barrier layer may be produced by oxidation of the surface of the metallic layer.

Further it is convenient to deposit the first layer by sputtering, too. In this manner, the first layer, the metallic layer, and the barrier layer may optionally be deposited in a single vacuum deposition process without intermediate venting.

It is possible to use different alloys for the metallic layer and for the barrier layer, with both layers having the high silicon content mentioned above. However, it is particularly advantageous, if the barrier layer is formed of an oxide of the alloy of the metallic layer. In this way, both layers may be deposited using the same alloy material, for example by sputtering from a stainless steel target, which greatly simplifies the manufacturing process.

According to a modification of the invention, the barrier layer may be formed as a gradient layer having a varying oxygen content, with the oxygen content in the barrier layer decreasing continuously in a direction perpendicular to the layer and to the metallic layer. In this way, the barrier layer will merge into the metallic layer without any sharp interface. This is advantageous to improve adhesion of the oxide to the metal alloy of the metallic layer.

According to one embodiment of the invention, the first layer comprises a $TiO_2$ layer. Titanium oxide in an appropriate thickness, preferably of less than 100 nanometers, is ideal for color adjustment, since due to its high refractive index and therefore a still significant refractive index difference as compared to the glass ceramic, an effective interference optical color change may be achieved. Besides $TiO_2$, other oxides having a high refractive index are as well possible as layer constituents, in particular those having a refractive index greater than two. Therefore, according to a modification of the invention, it is contemplated that the first layer comprises at least one of materials $Nb_2O_5$, $Ta_2O_5$, $Si_3N_4$, $ZrO_2$, $TiO_2$.

According to yet another embodiment of the invention, the first layer comprises or consists of a layer of an oxide of the alloy of the metallic layer. It has been found that the oxide of the stainless steel alloy is useful as a color adjustment layer. Here again, as with the inventive barrier layer of the oxide of the stainless steel alloy, an advantage is ease of manufacturing, since the same sputtering target can be used, and a very solid mechanical bond between the first and the metallic layer. Optionally, such a stainless steel oxide layer may be combined with a layer of another material, such as the titanium oxide mentioned above. Typically, in case of a stainless steel oxide a greater layer thickness will be employed for the first layer, due to the lower refractive index as compared to that of titanium oxide. Generally, however, the first layer preferably has a thickness of less than 400 nanometers. This embodiment is advantageous for its ease of manufacturing, since the first layer, the metallic layer and the barrier layer may be produced using a single target. In addition, the layer component chromium oxide of the oxidized stainless steel layer is an excellent adhesion promoter to the glass ceramic.

As with the barrier layer, the first layer may likewise be formed as a gradient layer. Here again, the oxygen content continuously decreases in a direction perpendicular to the layer and to the metallic layer. In this manner, good adhesion to the glass ceramic's lower surface is achieved due to the high oxygen content at the interface with the oxidic glass ceramic, and good adhesion to the metallic layer is achieved due the low oxygen content. Here, again, a sharp interface between the first layer and the metallic layer is avoided in this way.

For manufacturing, the first layer or the barrier layer may be deposited by sputtering from the same sputtering target which is used for depositing the metallic layer, and during sputtering the oxygen content of the process gas is varied in a manner so that a gradient layer is formed having an oxygen content that decreases towards the metallic layer.

Furthermore, according to one embodiment of the invention it is also possible to form both the first layer and the barrier layer as a gradient layer. Accordingly, it is contemplated that both the first layer and the barrier layer are provided as a gradient layer of varying oxygen content, with the first layer and the barrier layer merging into the metallic layer without an interface, or in other words, continuously.

A composition particularly preferred for the alloy of the metallic layer includes the following components:
Silicon: 2-5 at %;
Chromium: 22.0-28.0 at %;
Nickel: 15.0-21.0 at %; and
Iron: 48-56.0 at %.

Further, preferably, the carbon content of the metallic layer is less than 0.3 at %.

Moreover, a stainless steel with an austenite crystal structure is preferred for the metallic layer. These steels have found to be particularly stable in terms of temperature induced color changes.

According to yet another embodiment of the invention, the alloy may contain aluminum, with a content of up to 3 at % being preferably. Small amounts of aluminum may also improve the temperature resistance of the deposited layer.

Further, it has proven to be advantageous if the barrier layer is annealed after deposition. This heat treatment has found to be particularly effective in terms of posterior densification of the layer in case the heating is only superficial so that a large temperature gradient results in a direction perpendicular to the multilayer coating. Accordingly, in one embodiment of the method according to the invention, the multilayer coating including the barrier layer is treated by surface heating in a manner so that a temperature gradient of at least 200 K occurs within the uppermost 100 nanometers of the coating. Such high temperature gradients may be achieved by irradiation using a radiation source whose radiation is directly absorbed in the surface. For this purpose, lasers, halogen lamps, and UV lamps are primarily considered.

BRIEF DESCRIPTION OF THE DRAWINGS

The invention will now be described in more detail by way of exemplary embodiments and with reference to the accompanying drawings. In the drawings, the same reference numerals designate the same or similar elements. In the drawings.

DETAILED DESCRIPTION

Figure 1:
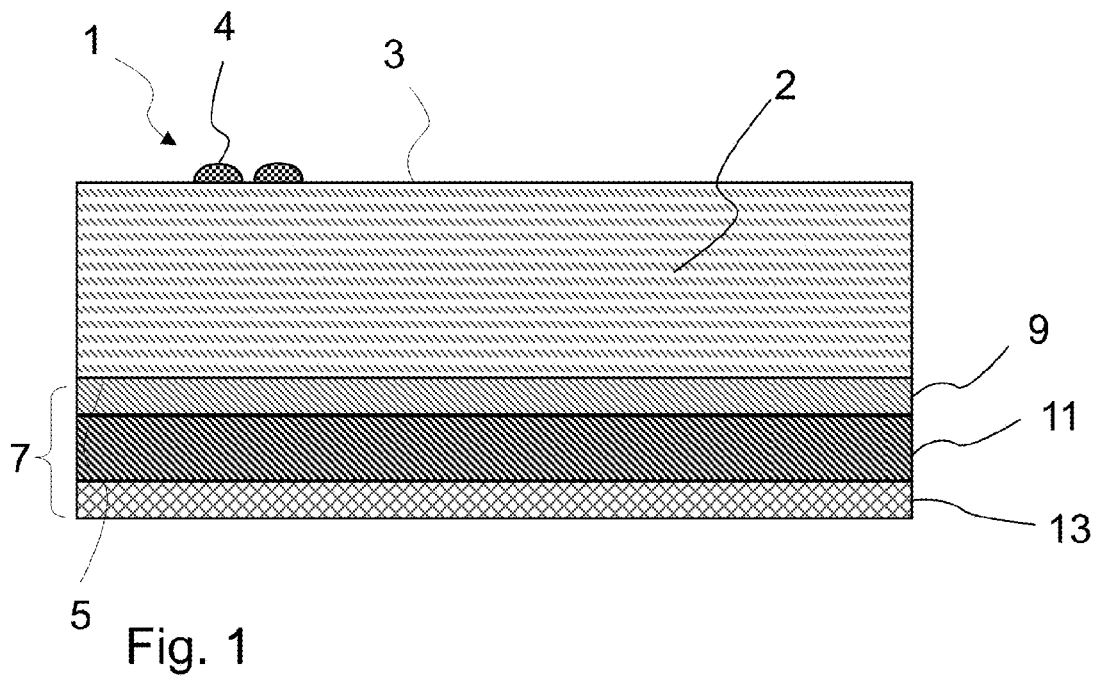
FIG. 1 is a schematic sectional view of a coated glass ceramic cooking plate.

The coated glass ceramic cooking plate 1 shown in FIG. 1 has a face 3 that constitutes a utilization side and defines the upper surface of a cooktop in its installed state. On the upper surface, a decoration pattern 4 may be applied, for example in form of labels, symbols, or to indicate the hot zone or display areas.

The opposite face 5 of glass ceramic cooking plate 1 defines the lower surface which in its installed state covers the substructure of the cooktop. In order to visually hide such a substructure, for example electrical equipment and/or gas conduits, lower surface 5 is provided with an opaque multilayer coating 7. This multilayer coating 7 on the glass ceramic 2 of glass ceramic cooking plate 1 comprises a first, at least partially transparent layer 9 which may be formed by a single or a plurality of layers. According to one embodiment of the invention, the first layer 9 comprises a layer of titanium oxide ($TiO_2$).

On this first, at least partially transparent layer, an opaque metallic layer 11 is deposited from an alloy including the components chromium, iron, nickel, and silicon. The layer has a composition as mentioned above. Accordingly, the silicon content of the alloy of this layer 11 is at least 2 atomic percent, the chromium content is from 22.0 to 28.0 at %, the content of nickel is from 15.0 to 21.0 at %, and the iron content is from 48 to 56.0 at %.

On this second, metallic layer 11, a barrier layer 13 is deposited in form of an oxide of an alloy including components chromium, iron, nickel, and silicon, again with a silicon content of at least 2 atomic percent, so as to cover the metallic layer 11. Barrier layer 13 is an oxide layer of the alloy, and the molar content of oxygen of barrier layer 13 is greater by at least a factor of 10 than the molar content of oxygen of metallic layer 11. Preferably, for ease of manufacturing, the same alloy as for the metallic layer is used. Accordingly, in this case, barrier layer 13 comprises an oxide of the alloy of metallic layer 11.

According to one embodiment of the invention, it is also possible for metallic layer 11 and barrier layer 13 to continuously merge into one another, so that there is no sharp interface between the two layers 11, 13. To this end, barrier layer 13 is deposited as a gradient layer with an oxygen content decreasing towards the metallic layer. During deposition, in turn, this means of course that the oxygen content of the layer is increased continuously or virtually continuously.

Optionally, a barrier layer may also be formed of multiple layers, and in that case only the barrier layer adjacent to the metallic layer 11 has to be a stainless steel oxide layer. This layer may then be covered by another barrier layer of a different material, e.g. silicon oxide. Generally therefore, without limitation to the specific exemplary embodiments illustrated in the figures, according to yet another embodiment of the invention a further barrier layer is provided of a material different from that of barrier layer 13 adjacent to metallic layer 11. This embodiment is advantageous to obtain better chemical stability and an improved barrier effect against different substances. For example, two different barrier layer materials permit to increase both acid resistance and alkali resistance. Another advantage is that the barrier layer 13 of stainless steel oxide may at the same time serve as an adhesion promoter for the further barrier layer and the metallic layer.

Figure 2:
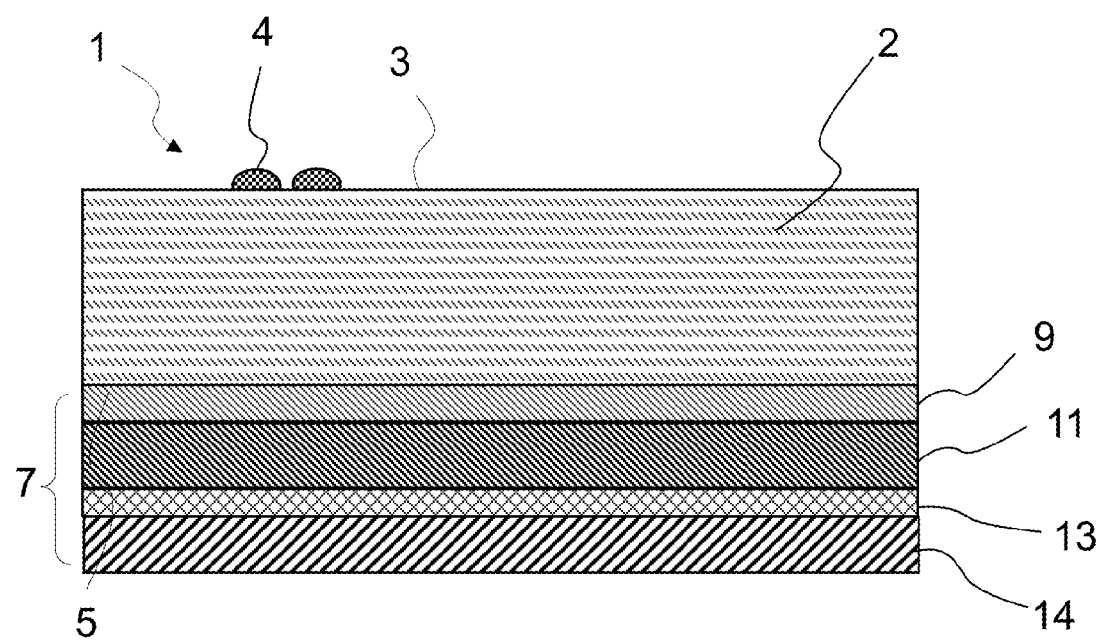
FIG. 2 illustrates a modification of the embodiment shown in FIG. 1.

FIG. 2 illustrates such a modification of the embodiment shown in FIG. 1. The structure of layers 9, 11, 13 corresponds to that of the embodiment shown in FIG. 1. Additionally, the multilayer coating 7 here comprises a second barrier layer 14 which is deposited upon barrier layer 13. Suitable for the second barrier layer 14 is silicon oxide, for example, which exhibits a high barrier effect and additionally a high acid resistance. Moreover, this material adheres very well upon the stainless steel oxide of barrier layer 13.

Figure 3:
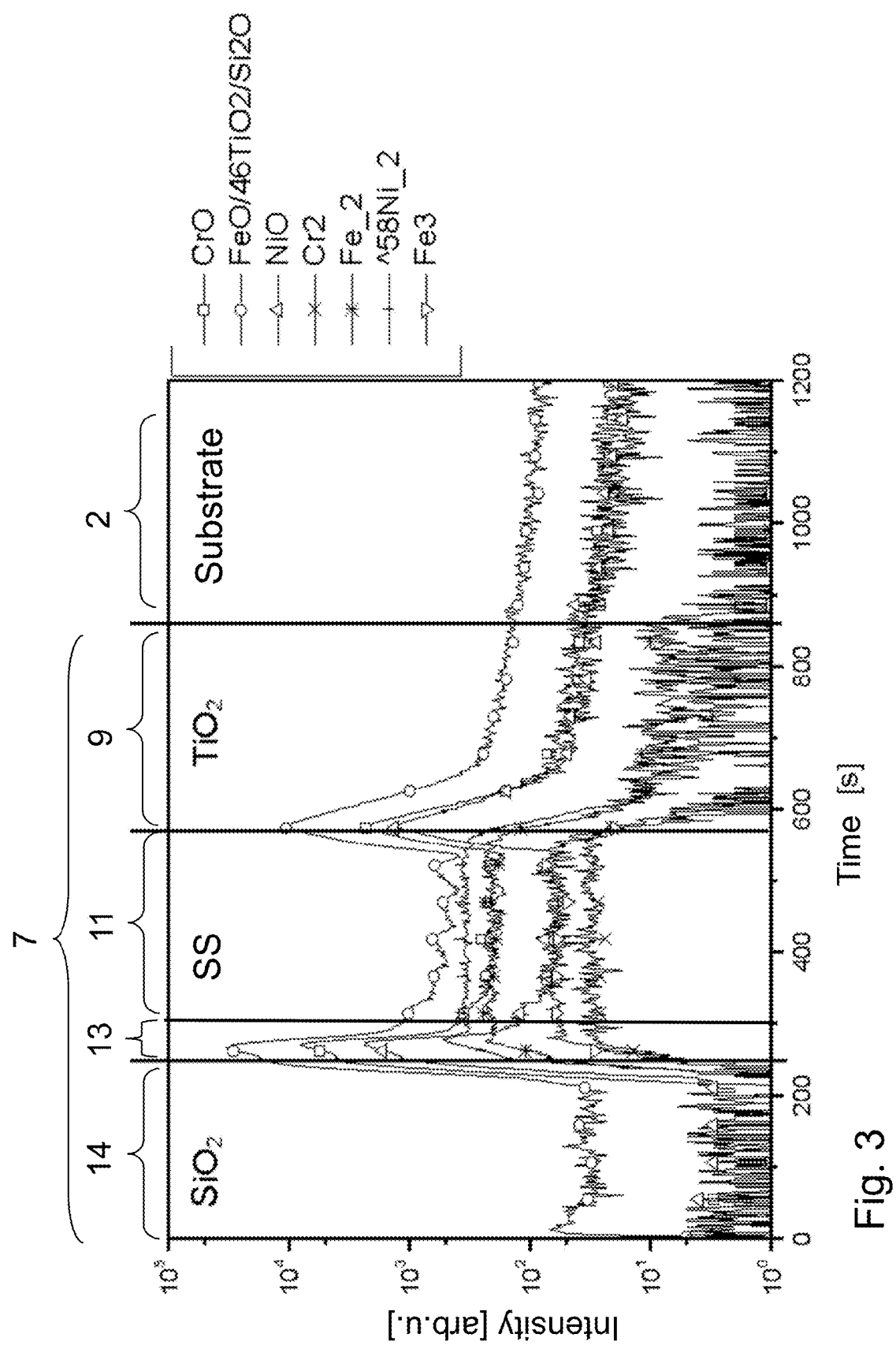
FIG. 3 shows a SIMS depth profile analysis of a lower surface coating of a glass ceramic cooking plate.

FIG. 3 shows a secondary ion mass spectrometry analysis (SIMS analysis) of a multilayer coating 7 according to the invention on a glass ceramic substrate. The graph shows the intensity of various sputtered layer components, such as CrO, NiO, $Fe_2$, as a function of sputter time.

Coating 7 comprises, as a first, transparent layer 9 used for color adjustment, a titanium oxide layer. Deposited upon the titanium oxide layer is a stainless steel layer as a metallic layer 11 of a composition according to the invention. The deposited layer has then been oxidized superficially to form an oxide layer of the stainless steel alloy as a barrier layer 13. Therefore, without being limited to the specific exemplary embodiment illustrated in FIG. 3, according to one embodiment of the invention it is contemplated to produce the metallic layer 11 and the barrier layer 13 by sputter-depositing a metallic layer 11 and subsequently oxidizing the metallic layer 11 at its surface.

On this barrier layer 13, a further barrier layer 14 is deposited in form of a SiO$_2$ layer. The TiO$_2$ layer, the stainless steel layer, and the SiO$_2$ layer each have a thickness of 100 nanometers.

Barrier layer 13 is clearly recognizable in the SIMS profile by an elevation of the intensity of components NiO (curve illustrated with upright triangles as measured values), CrO (curve illustrated with squares as measured values), and FeO (curve illustrated with circles as measured values). For all these components, the elevation when compared to the layer volume of metallic layer 11 is more than one order of magnitude. Accordingly, the oxygen content in barrier layer 13 is greater by at least a factor of 10 than that of the metallic layer. Here, barrier layer 13 is not used as a barrier but also as an adhesion promoter for further barrier layer 14. The combination of the stainless steel oxide with a silicon oxide layer is moreover advantageous in terms of chemical resistance of the coating 7. That is, the different chemical resistances of the two barrier layers 13, 14 may cooperate to protect the metallic layer from chemical attack. Silicon oxide, for example, exhibits a high resistance to acids but is attacked by alkaline substances. By contrast, the stainless steel oxide of barrier layer 13 is highly resistant to alkalis.

Figure 4:
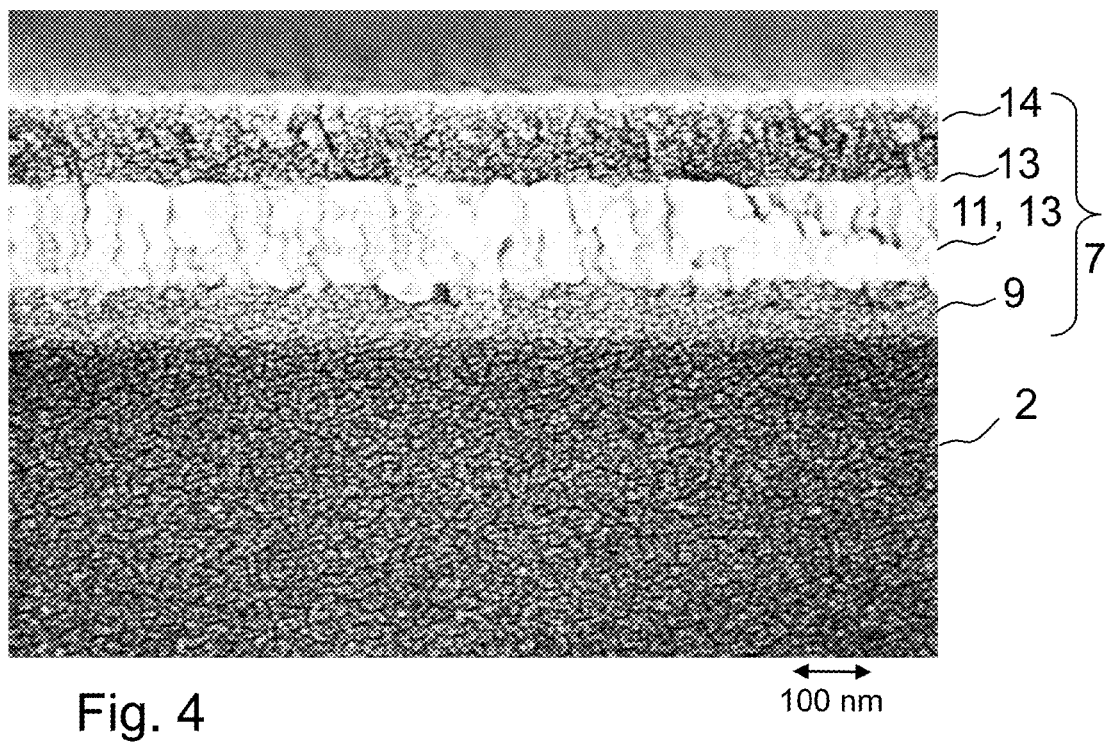
FIG. 4 is a scanning electron micrograph of a fracture edge of this glass ceramic cooking plate.

FIG. 4 is a scanning electron micrograph of the cross section of the coated glass ceramic cooking plate at a fracture edge. Layers 9 and 14 are clearly distinguishable, due to the different brightness from layers 11 and 13 made of a stainless steel alloy. Between layer 11 and barrier layer 13, however, no clear contrast can be seen, because they are of chemically the same composition, except for the oxygen contained in the barrier layer.

Figure 5:
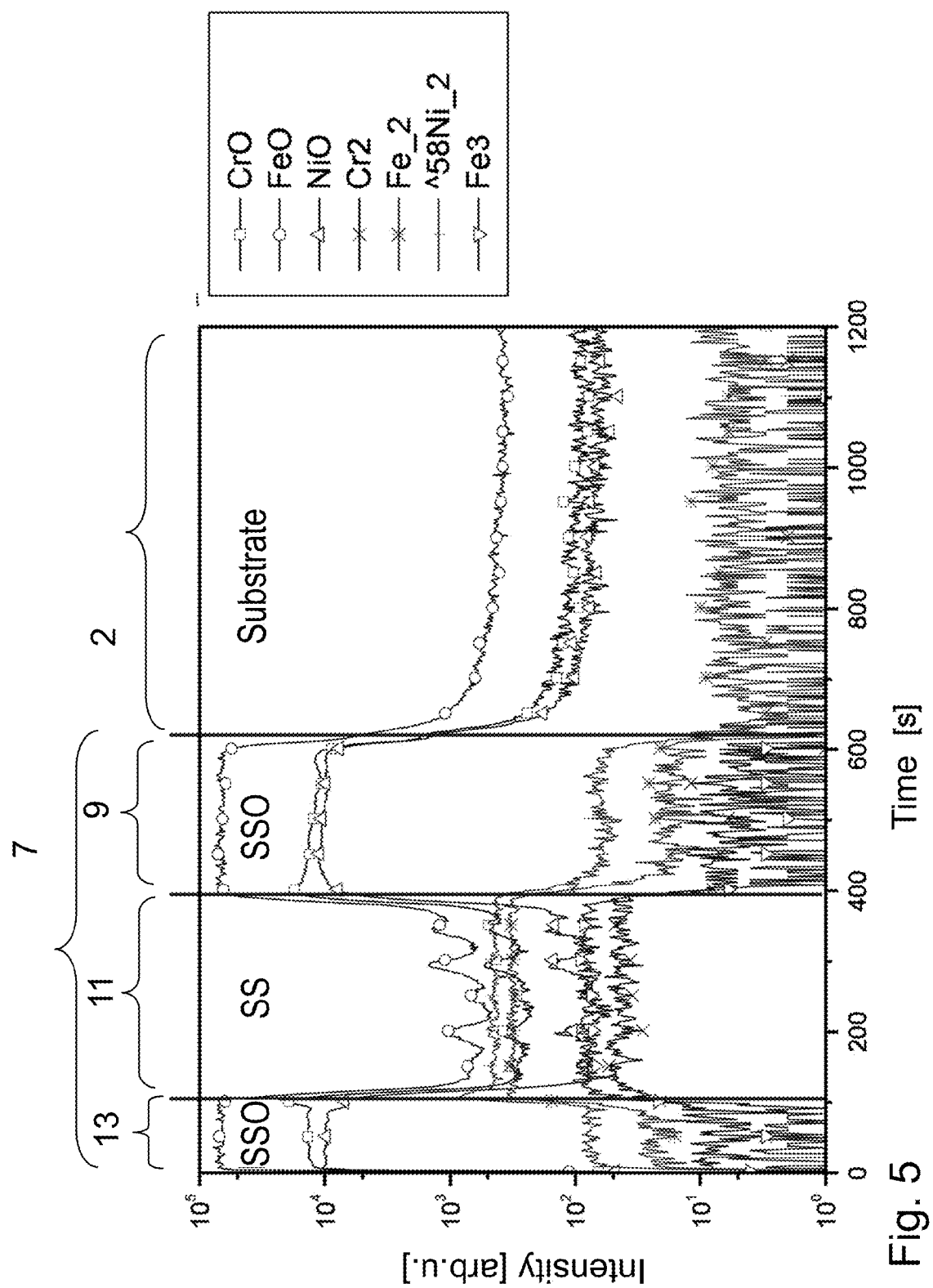
FIG. 5 shows a SIMS depth profile analysis of a lower surface coating of another embodiment of a glass ceramic cooking plate including a stainless steel oxide color adjustment layer.

FIG. 5 shows a SIMS depth profile analysis of the lower surface coating according to another embodiment of the invention. This embodiment is based on the fact that the first layer 9 is made of an oxide of the alloy of the metallic layer 11. In other words, here, the TiO$_2$ color adjustment layer of the exemplary embodiments of FIG. 3 and FIG. 4 has been replaced by a transparent or at least semi-transparent stainless steel oxide color adjustment layer. Specifically, the layer sequence herein includes a first layer 9 of 200 nanometers thickness on which a metallic layer 11 of likewise 200 nanometers thickness is deposited. Accordingly, even if stainless steel oxide is used to achieve color adjustment, a thickness of the first layer 9 of less than 400 nanometers will be sufficient.

The barrier layer 13 deposited on metallic layer 11 also consists of an oxide of the material of the metallic layer 11, like transparent first layer 9. Barrier layer 13 has a thickness of 100 nanometers.

In contrast to the preceding example of FIG. 3 and FIG. 4, the stainless steel oxide layers have been produced by reactive sputtering from the stainless steel target in an oxygen containing atmosphere. Thus, oxidation is not accomplished subsequently to but already during the deposition. This embodiment of the invention offers the particular advantage that all layers 9 through 13 may be produced in a single sputtering process, without a need to change the sputter target. Moreover, this embodiment is advantageous because of the excellent adhesion of layers 9 and 13 to the metallic layer 11 on the one hand and to the glass ceramic material 2 on the other. Given the very different thermal expansion coefficients of stainless steel and the glass ceramic plate, good adhesion of the layers is particularly favorable in order to avoid delamination of the lower surface coating 7 when the glass ceramic cooking plate is in operation and subjected to thermal stress.

As with the embodiment of FIG. 3, the stainless steel oxide layers, namely first layer 9 and barrier layer 13 in this case, are well distinguished in the SIMS profile, since the signal of oxidic constituents is higher by more than a factor of 10 as compared to the metallic layer 11.

Figure 6:
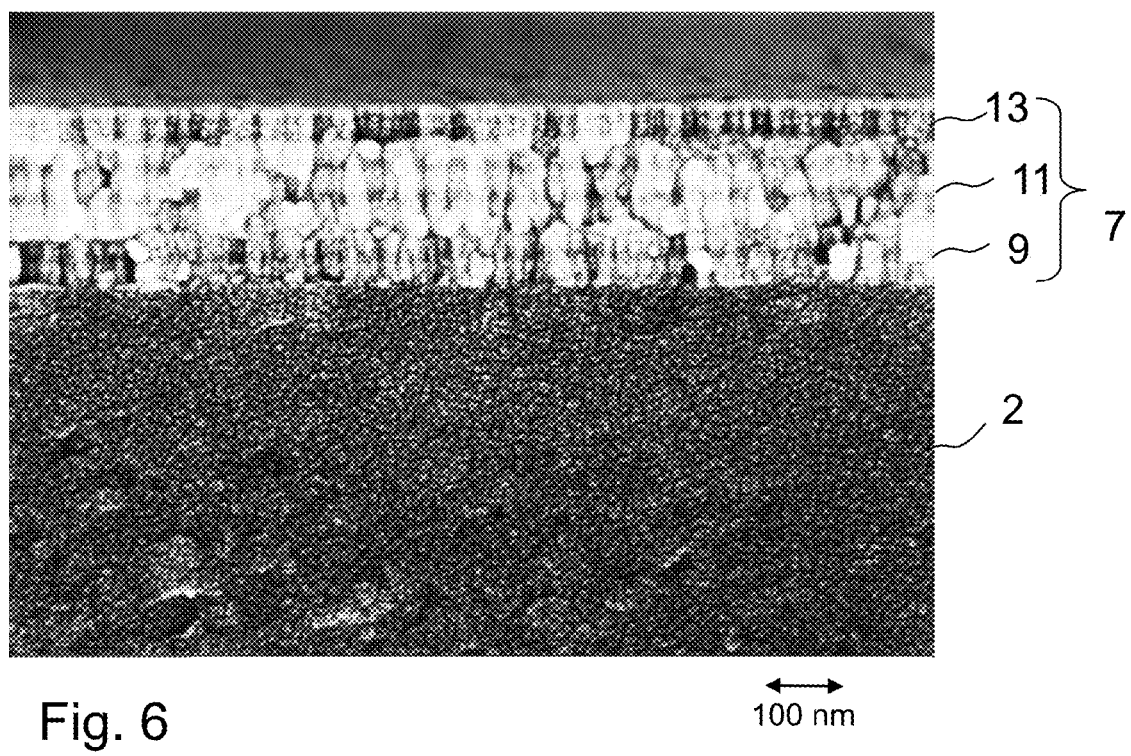
FIG. 6 is a scanning electron micrograph of a fracture edge of the sample used for the measurement shown in FIG. 5.

FIG. 6 shows a scanning electron micrograph of a fracture edge of the sample on which the measurement of FIG. 5 was based. The stainless steel oxide layers, namely layers 9 and 13, can still be distinguished from metallic layer 11. Though the contrast is nearly the same, metallic layer 11 has a somewhat more coarse-grained structure.

Figure 7:
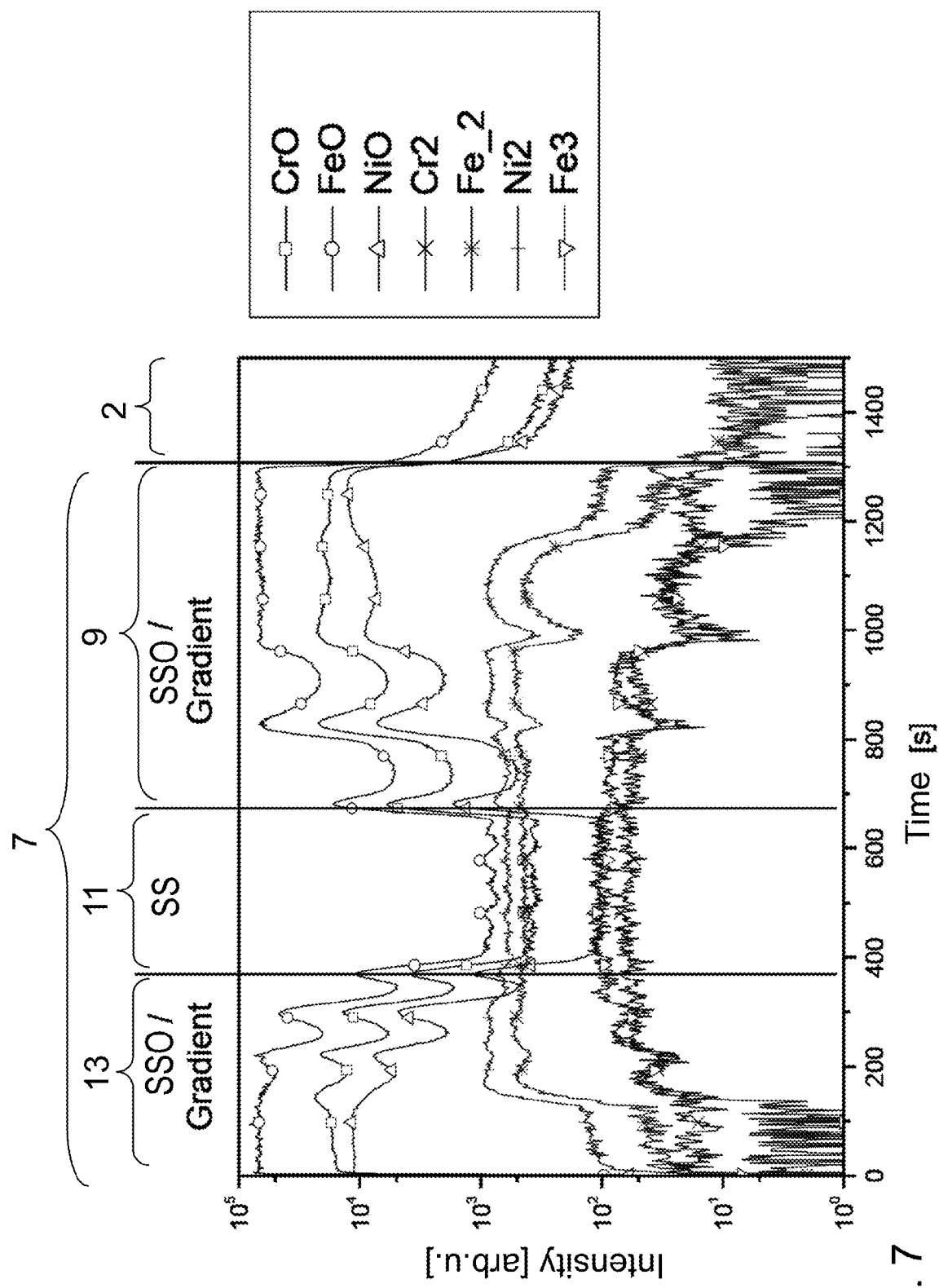
FIG. 7 shows a SIMS depth profile analysis of a lower surface coating of an embodiment including a color adjustment layer and barrier layer formed as a gradient layer.

Now, an exemplary embodiment will be described, in which the first layer 9 and the barrier layer 13 are also formed from an oxide of the alloy of metallic layer 11. As a modification to the embodiment of FIGS. 5 and 6, however, first layer 9 and barrier layer 13 are both formed as a gradient layer having a varying oxygen content, with the first layer 9 and the barrier layer 13 merging into the metallic layer 11 without any interfaces, i.e. continuously. FIG. 7 shows the SIMS profile of such a multilayer coating 7. As can be seen from the intensities of oxygen containing layer constituents CrO, FeO, NiO, layers 9 and 13 have a region of constant oxygen content, adjoined in each case by a transition region with a gradient in oxygen content towards metallic layer 11. Specifically, in each case the oxygen content decreases towards metallic layer 11. Layer thicknesses are similar to those of the exemplary embodiment of FIGS. 5 and 6. Accordingly, first layer 9 and metallic layer 11 have a thickness of 200 nanometers, and the barrier layer has a thickness of 100 nanometers.

Figure 8:
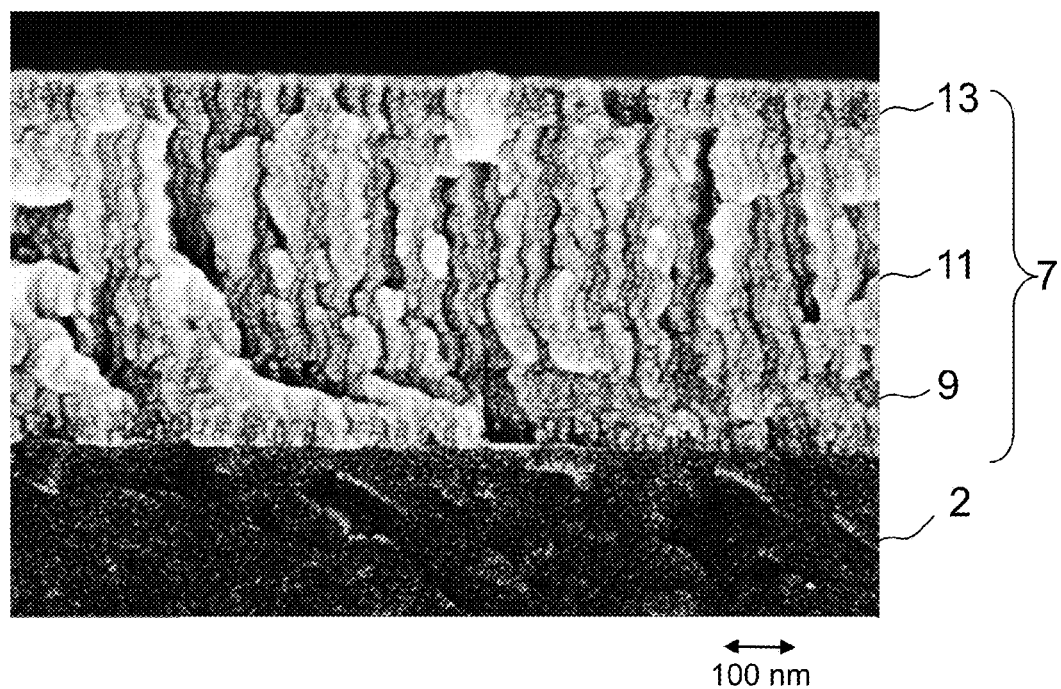
FIG. 8 is a scanning electron micrograph of a fracture edge of the sample used for the measurement shown in FIG. 7.

FIG. 8 again shows a scanning electron micrograph of the cross section of coating 7 at a fracture edge. Because of the gradient in oxygen content, layers 9, 11, and 13 cannot be sharply distinguish from each other herein. But even here it can be seen that layers 9 and 13, in their oxygen-rich and hence distant regions from metallic layer 11, exhibit a more fine-grained structure than metallic layer 11. Since the layers merge into each other without sharp interfaces, a layered composite is resulting which is well able to compensate for mechanical stresses caused by different thermal expansion coefficients, for example.

Figure 9:
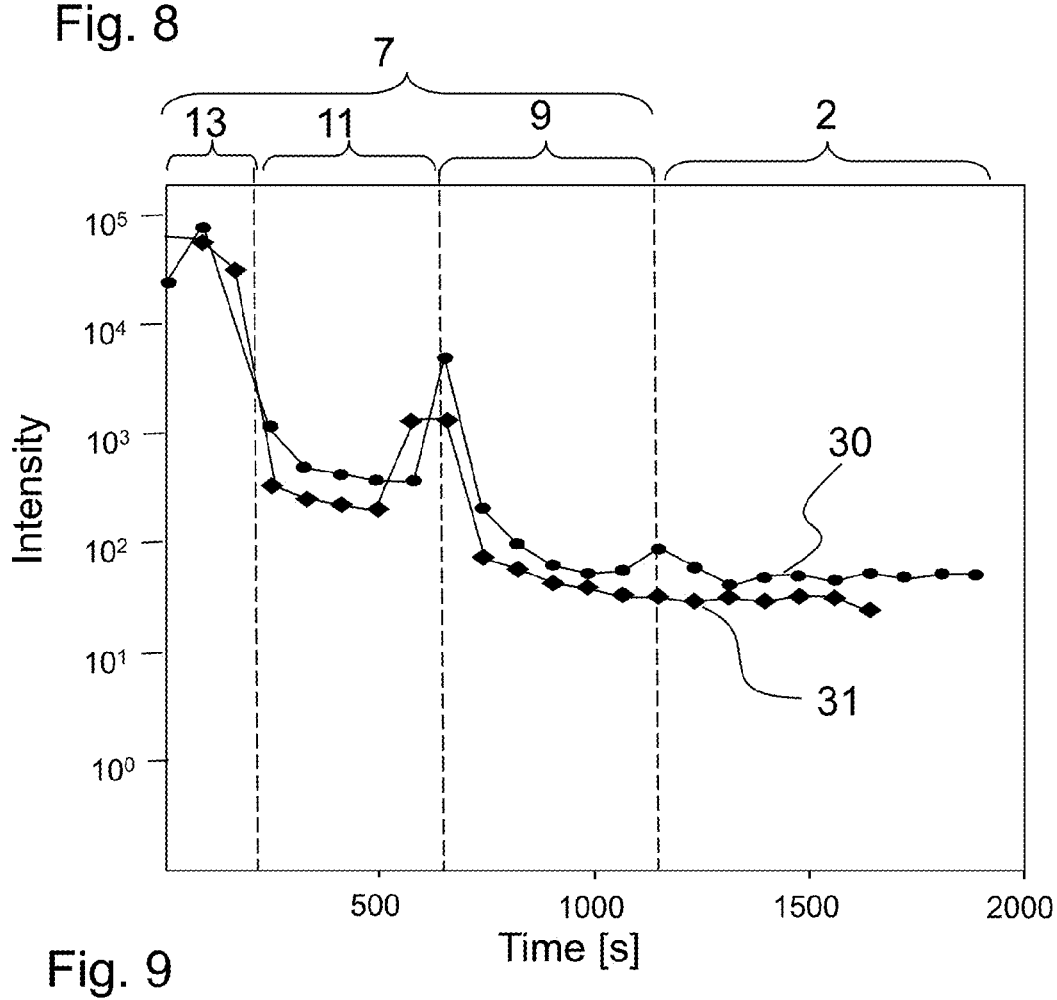
FIG. 9 is a SIMS depth profile analysis of a lower surface coating before and after thermal stress.

FIG. 9 shows a SIMS depth profile analysis of constituent FeO of a lower surface coating including a TiO$_2$ color adjustment layer (first layer 9), a stainless steel layer according to the invention (metallic layer 11), and a stainless steel oxide layer (barrier layer 13) before and after temperature stress. The interfaces between the glass ceramic material and the individual layers of coating 7 indicated by dashed lines can also be identified based on the intensities of other constituents, such as TiO. For the sake of clarity, however, FIG. 9 only shows FeO as an indicator of the degree of oxidation of the coating. Curve 30 shows the intensity of the constituent FeO before thermal treatment, curve 31 the intensity following thermal treatment. In this example, the sample was annealed for 100 hours at a temperature of 300° C. As can be seen from FIG. 9, there are no significant changes in the oxidation of layers 11, 13.

Figure 10:
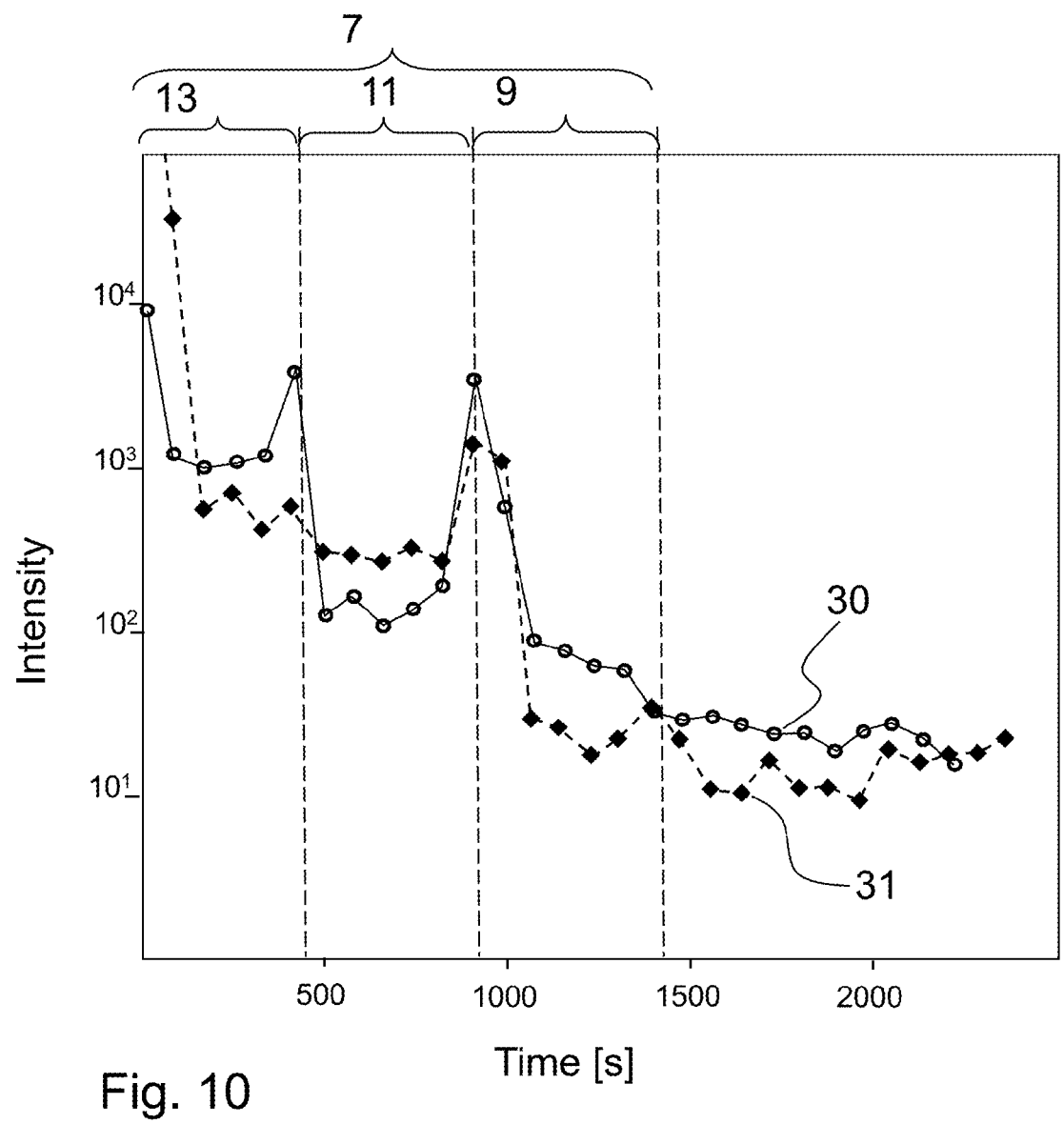
FIG. 10 is a SIMS depth profile analysis of a lower surface coating before and after thermal stress, wherein the stainless steel oxide layer of the lower surface coating has been replaced by a stainless steel nitride layer.

It has been found, surprisingly, that the oxide of the stainless steel alloy provides a substantially better barrier effect than a nitride of the alloy. For comparison with FIG. 9, FIG. 10 shows SIMS profiles of a corresponding layer system, in which the oxide of barrier layer 13 was replaced by a nitride of the inventive silicon-rich stainless steel alloy. Intensity 31 of FeO content plotted after thermal treatment which was performed under the same conditions as with the embodiment of FIG. 9, shows significant changes. First, the barrier layer 13 itself is oxidized at its surface, as evidenced by the strong signal at the beginning of sputtering. On the other hand, the oxygen content of metallic layer 11 also increases. This proves that the stainless steel layer experiences a chemical change during thermal stress. This may be accompanied by visible color changes which are unfavorable, at least for aesthetic reasons, especially since the temperature stress of a glass ceramic cooking plate will differ considerably along the surface due to the heating elements.

In each of the exemplary embodiments described so far with reference to the figures, a first layer is provided in form of an at least partially transparent layer 9 which contacts the glass ceramic and upon which the metallic layer 11 is deposited. However, as mentioned before, it is also possible for the metallic layer 11 to be directly deposited upon the glass ceramic, preferably by sputtering. Although this eliminates the possibility to change or correct the color impression occurring when looking at the utilization side of glass ceramic cooking plate 1, this is not absolutely necessary if the desired color is already achieved by the combination of glass ceramic and stainless steel layer deposited thereon.

Figure 11:
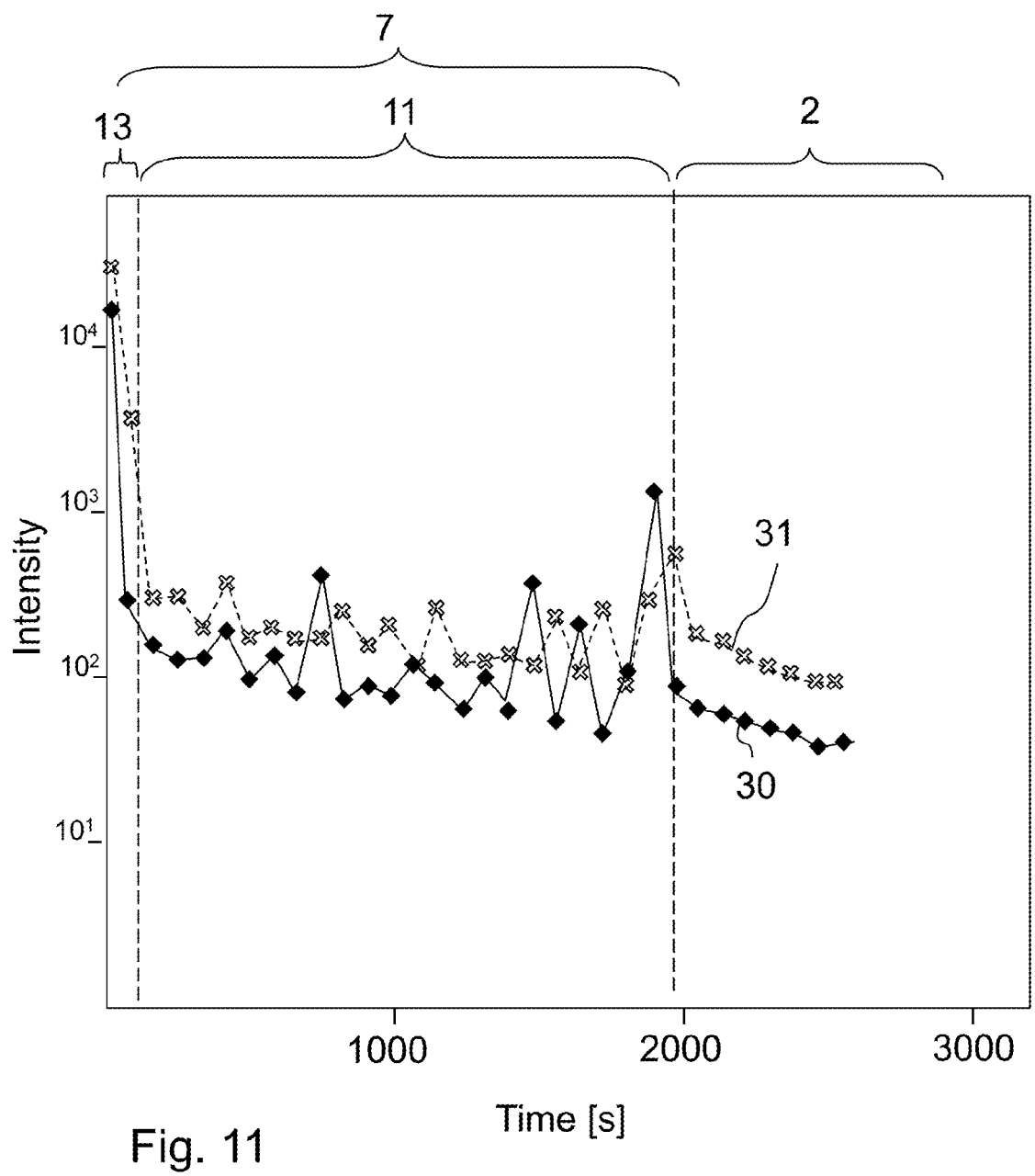
FIG. 11 is a SIMS depth profile analysis of a lower surface coating before and after thermal stress, wherein the metallic layer of the lower surface coating has directly been deposited on the glass ceramic.

The silicon-rich stainless steel alloy when used according to the invention and directly sputter-deposited onto the glass ceramic has likewise proven to be highly temperature resistant, despite the great difference in thermal expansion coefficients of the coating and the glass ceramic. For this, FIG. 11 shows a SIMS depth profile analysis of a lower surface coating prior to and following thermal stress, in which the metallic layer 11 of the lower surface multilayer coating 7 was directly deposited upon glass ceramic 2. Again, as in FIGS. 9 and 10, the signal of sputtered FeO particles is plotted as a function of sputter time. Curve 31 indicates the intensity of FeO particles after thermal treatment for 100 hours at 300° C. In fact there is a slight increase in the FeO content noticeable as compared to curve 30 recorded for a non-annealed reference sample, but the barrier layer 13 is very thin here. However, even in this case the comparatively lower increase as compared to the example of FIG. 10 proves the high efficiency of the inventive silicon-rich stainless steel oxide barrier layer.

The excellent heat resistance of the lower surface coating of metallic appearance as proposed by the invention in form of a combination of an optional but preferred coloring transparent layer, a metallic layer of a silicon containing stainless steel alloy, and an oxide of a silicon containing stainless steel alloy, is additionally evidenced when compared to a chromium layer as a lower surface coating. A comparable layer system in which the metallic layer was a chromium layer, was heated to a temperature of 500° C. Thereafter, a color change ΔE of 4.7 in the xyY color space was detected relative to the color value prior to heating. The haze value was 35. By contrast, when heating a multilayer coating according to the invention to 500° C., the detected color change ΔE in the xyY color space was only 0.35. The haze value was 4. Generally, a color change with a difference ΔE of less than 2 in the xyY color space is assumed to be not perceptible. Thus, an inventive layer system is far from this limit, while with a chromium layer the color change is visible.

It will be apparent to those skilled in the art that the figures are merely illustrative examples. In particular, the exemplary embodiments may be combined. For example, the barrier layer formed as a gradient layer according to FIG. 8 may additionally be covered by an $SiO_2$ layer as shown in FIG. 4 in order to improve the barrier effect. Further, for example, instead of the titanium oxide provided as a first layer in the embodiment of FIG. 4, another preferably high refractive index oxide having a refractive index of greater than 2 may be used to achieve color adjustment.

LIST OF REFERENCE NUMERALS

1 Glass ceramic cooking plate
2 Glass ceramic material
3, 5 Faces of 1
4 Decoration pattern
7 Multilayer coating
9 First layer of 7
11 Metallic layer
13 Barrier layer
14 Further barrier layer
30 FeO content before thermal treatment
31 FeO content after thermal treatment

What is claimed is:

1. A coated glass ceramic cooking plate, comprising:
one face defining an utilization side;
an opposite face defining a lower surface; and
a multilayer coating including a metallic layer at the lower surface and a barrier layer covering the metallic layer, the metallic layer being an alloy comprising chromium, iron, nickel, and silicon, and the barrier layer being an oxide of an alloy comprising chromium, iron, nickel, and silicon, the alloy of the barrier layer having a silicon content of at least 2 atomic percent, the barrier layer having a molar content of oxygen that is greater by at least a factor of 10 than a molar content of oxygen of the metallic layer,
wherein the alloy of the metallic layer comprises the following components:
silicon: 2 to 5 atomic percent;
chromium: 22 to 28 atomic percent;
nickel: 15 to 21 atomic percent; and
iron: 48 to 56 atomic percent.

2. The coated glass ceramic cooking plate as in claim 1, wherein the barrier layer is formed of a same material as the alloy of the metallic layer.

3. The coated glass ceramic cooking plate as in claim 2, wherein the barrier layer is formed as a gradient layer of varying oxygen content, and wherein the barrier layer has an oxygen content that decreases continuously in a direction perpendicular to the barrier and metallic layers to improve adhesion of the oxide of the barrier layer to the alloy of the metallic layer.

4. The coated glass ceramic cooking plate as in claim 1, wherein the multilayer coating includes a first, at least partially transparent layer on the glass ceramic cooking plate, and wherein the metallic layer is deposited upon the first, at least partially transparent layer.

5. The coated glass ceramic cooking plate as in claim 4, wherein the first, at least partially transparent layer is a single layer or a multilayer.

6. The coated glass ceramic cooking plate as in claim 4, wherein the first, at least partially transparent layer comprises at least one component selected from the group consisting of $Nb_2O_5$, $Ta_2O_5$, $Si_3N_4$, $ZrO_2$, and $TiO_2$.

7. The coated glass ceramic cooking plate as in claim 4, wherein the first, at least partially transparent layer comprises a layer of an oxide of the alloy of the metallic layer.

8. The coated glass ceramic cooking plate as in claim 7, wherein the first, at least partially transparent layer is formed as a gradient layer, wherein the first, at least partially transparent layer has an oxygen content that continuously decreases in a direction perpendicular to the barrier layer and metallic layer.

9. The coated glass ceramic cooking plate as in claim 4, wherein the first, at least partially transparent layer has a thickness of less than 400 nanometers.

10. The coated glass ceramic cooking plate as in claim 4, wherein both the first, at least partially transparent layer and the barrier layer are formed as gradient layers of varying oxygen content, and wherein the first, at least partially transparent layer and the barrier layer merge into the metallic layer without interfaces.

11. The coated glass ceramic cooking plate as in claim 1, further comprising a barrier layer of a material different from that of the barrier layer covering the metallic layer.

12. The coated glass ceramic cooking plate as in claim 1, wherein the metallic layer has an austenite crystal structure.

13. The coated glass ceramic cooking plate as in claim 1, wherein the metallic layer has a carbon content that is less than 0.3 at %.

* * * * *